UNITED STATES PATENT OFFICE.

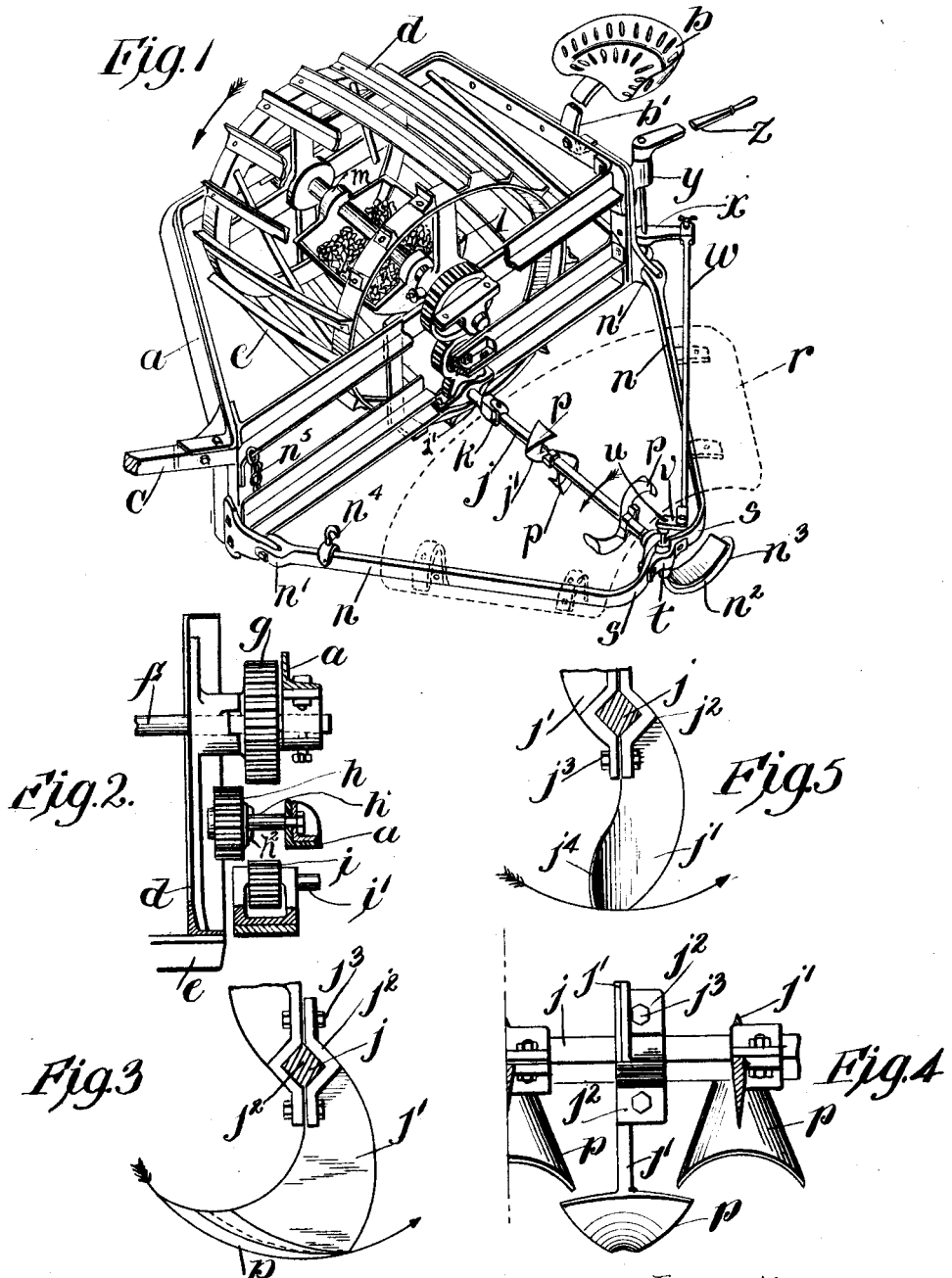

REUBEN MANSELL, OF IRYMPLE, VICTORIA, AUSTRALIA.

SUBFOLIAGE AND OTHER CULTIVATOR OR WEED-CUTTER.

1,052,264.  Specification of Letters Patent.  Patented Feb. 4, 1913.

Application filed August 3, 1912. Serial No. 713,141.

*To all whom it may concern:*

Be it known that I, REUBEN MANSELL, a subject of the King of Great Britain and Ireland, &c., residing at Irymple, in the State of Victoria, Commonwealth of Australia, have invented certain new and useful Improvements in Subfoliage and other Cultivators or Weed-Cutters; and I do hereby declare the following to be a full, clear, and exact description of the invention, such as will enable others skilled in the art to which it appertains to make and use the same.

This invention relates to a sub-foliage weed cutting cultivator for vineyards and orchards to work chiefly under leaves and branches which hang so low that the ground beneath them cannot be cultivated by ordinary plows or horse drawn implements.
The invention does not tend to supersede the use of plows and harrows for working land accessible to them, but it will enable a great deal of hand weeding to be abolished. The attempts of drivers of existing styles of implement to work the latter close into vine and fruit tree stems often damages such vegetation. To enable ordinary plows and cultivators to work close to such stems some vines and trees are grown with their branches raised higher from the ground than nature intended, the result being that the stems are not normally protected from sun and hot winds and the ground under the foliage becomes hardened or abnormal.
This leads in some cases to extra expense or trouble when pruning, fumigating, and fruit picking become necessary.

My implement may be used to deal with weeds not overhung by foliage, and it will cultivate the soil to some shallow depth pre-arranged for. The highest part of my implement will be kept comparatively near the ground at the part that may work beneath foliage, and there is a shield provided such that the latter may touch low boughs and leaves and may push them up or aside without injuring them. Horses will usually be employed to walk between rows of vines or trees, drawing my implement, part of which will follow the horse track, while another part or lateral extension of the frame has weed cutting and cultivating devices and will pass under foliage.

My implement could be provided with a motor for propelling it, but I shall describe the simpler horse drawn form. The cultivating parts of the latter are rotated by the rotation of a traveling wheel of the implement, and this wheel is of any suitable size:—three feet in diameter in some cases. The preferred traveling wheel resembles a drum with ends which taper in barrel fashion. This taper allows the implement to set differently from time to time to suit the contour of the ground. As the speed of an ordinary agricultural implement is slight, and I find that to destroy the weeds members moving faster are required, I use speed increasing means, as a train of gear wheels which rotate the axle of the members used as cultivators, weed cutters, and soil clearers. The cultivating of the ground can be effected without interfering with those roots of vines or plants which are fairly near the surface of the soil, and too high for ordinary plow shares to pass over. My implement has means provided for weighting it, and the adjusting and changing of its weeding members or like parts can be effected at will.

The above and other details are illustrated in the accompanying drawings, but the sizes, numbers and designs of parts may be varied considerably, while keeping within what I claim. The implement may be used with or without a driver's seat, or a footboard, or other minor accessories to which I make no claim.

Figure 1 shows a perspective view of my implement with some parts omitted. Fig. 1 is on a smaller scale than the other views. Fig. 2 is a front elevation partly sectional showing some portions of Fig. 1. Figs. 3, 4, and 5, show weed cutting and soil treating details. Thus Fig. 3 is a side view in section through an axle. Fig. 4 is a view of parts in Fig. 3 at right angles to the latter figure, and Fig. 5 exhibits one of various practicable modifications of the parts in Fig. 3.

In these views $a$ is the main frame, $b$ a driver's seat with pillar $b^1$, $c$ a draft means, $d$ a traveling wheel, shown with a wide tread which may carry or be composed of a series of soil ripping members, as bars of angle-iron $e$, having edges adapted to firmly grip the ground. On the axle $f$ of this traveling wheel which is shown of barrel shape is a gear wheel $g$, one of a series which may be set in mesh with one another.

For example the series shown includes smaller wheels $h$, and $i$, such that the latter would rotate much faster than wheel $g$. The gear wheel or pinion $i$, has its axle $i^1$ connected to a spindle $j$, a suitable joint $k$ being used to allow the said spindle freedom of movement (in addition to any rotary action) to suit those variations of ground surface which the implement as it advances will encounter. Wheel $h$ can be normally moved into gear in the case illustrated by taking out cotter pin $h^2$ sliding the wheel and replacing the pin, but other adjusting means may be substituted. During travel, the axle $j$ turns rapidly normally, but the axle can be thrown out of gear as will now be evident. Frame $a$ and wheel $d$ are made heavy, and the weight is regulated and increased where desired. Thus for extra weight a receptacle or bucket $l$ is suspended from axle $f$ within wheel $d$, by means of lugs or ears $m$, and scrap iron, stones, or earth may be put in this bucket, which is easy to load or lighten, as it does not rotate on support $f$.

$n$ indicates a side extension or frame, connected as by pivots $n^1$ to main frame $a$. Frame $n$ has an outer runner or skid $n^2$, with a blade or share $n^3$, adapted to enter the ground to a slight depth. Skid $n^2$ is adjustable in height as by setting its spindle $u$ which passes through a bearing $t$, at the outer end of frame $n$. It is also adjusted so that it can be swung on its spindle there being intermediate links as $v$, $w$, $x$, from spindle $u$, to the spindle $y$ of an adjusting handle $z$ to be attended to by the driver, who will actuate it when such an adjustment will enable a stump or the like to be avoided. The curved end $s$ of frame $n$ stands out to the side of the implement beyond the skid $n^2$ and thus promotes the sliding of the frame end past the edges of various obstructions that may be met. After handle $z$ has been operated and released the cutter $n^3$ will return to its normal position of travel somewhat as a caster on furniture does.

Axle $j$ carries cultivating or weed cutting members which can be, in my preferred construction, longitudinally shifted to any desired respective positions. The members may be adjustable or may be changed for others of different size or form or to vary the depth of cut. The members shown have shares or cutters $j^1$, and attached to them duck feet or like suitable plates $p$. As drawn parts $j^1$, $p$, and clamp head $j^2$ are integral, and such integral parts are shown in pairs fixed tight upon axle $j$ by bolts $j^3$, and in such position that during rotation each cutter is followed by its duck foot or thruster, and the latter by the cutter of the other member of the pair. These details may be varied however. The direction of rotation is as shown by arrows, and the action on weeds and on the soil of the cutter or share $j^1$ is followed by a rearwardly thrusting action of the rotating duck feet or plates, the outer ends of which are wide. These feet push to their rear the weeds that are cut and make the ground smoother. The cutters and duck feet are set on spindle $j$ (see Fig. 4) sufficiently close to one another to make adjacent duck feet overlap at their outer ends and are not as in Fig. 1 which shows only a few of the cutters and duck feet. Other rubbish on the ground besides weeds will also be thrust backward by the soil clearing members $p$. When part $h$ is detached, so as not to be rotated by wheel $g$ axle $j$ is out of gear. A supply of cultivator members (to attach to spindle $j$) of different lengths and designs may be kept in reserve.

A shield $r$ may be as illustrated by dotted lines with its top sufficiently smooth and rounded to enable it to pass safely under low foliage. Wheel $d$ may have a cover but it is not shown and would rarely be useful. The cultivating parts attachable to spindle $j$ may be varied greatly; thus in Fig. 5 the cutter $j$ has a lateral flange or wing $j^4$ at one or each side of its rear instead of a duck foot $p$. Instead of the barrel shaped wheel $d$ a plurality of other wheels is usable, forming part of a main frame, adapted to keep extension $n$ in working position at the side of the main frame. Frame $n$ can by reason of the pivots or joints $n'$ and $k$ work either on the level or from time to time on sloping ground, and can adjust itself according to the soil surface. The depth of cut is regulated by the position of the skid $n^2$.

When the implement is being drawn to or from work and it is desired that the cultivating members shall be clear of the ground, the side frame $n$ can be raised as by coupling some suitable part of a chain or chains as $n^5$ or the like to any suitable hook or hooks as $n^4$.

Having described this invention what is claimed by Letters Patent is:—

1. In a cultivator, the combination of a vehicle; a frame swingingly mounted on the side of the vehicle; a shaft journaled on said frame; cultivating implements mounted on said shaft; means for rotating said shaft through the travel of the vehicle; a share swiveled on the outer end of the frame and supporting the same; and means for adjusting said share, substantially as described.

2. In a cultivator, the combination of a wheeled vehicle; a frame swingingly mounted on the vehicle; a shaft journaled on said frame; cultivating implements mounted on said shaft; a pinion mounted on the shaft; pinions mounted on the vehicle and driven through the travel thereof, and adapted to drive the pinion on said shaft; a share swiveled on the outer end of the frame and supporting the same; and means for adjusting said share, substantially as described.

3. In a cultivator of the character described, the combination of a wheeled vehicle; a frame swingingly mounted on the side of the vehicle; a shaft journaled in said frame and having a universal coupling; a pinion mounted on said shaft; a pinion connected to be driven from the wheel vehicle; an intermediate pinion mounted on the vehicle and adapted to be moved into and out of engagement with said driven pinion and the shaft pinion; a plurality of cultivating implements mounted on the shaft; a share swiveled on the outer end of the frame and supporting the same; a lever mounted on the vehicle; and connections between said lever and said swiveled share whereby to manually position the latter, substantially as described.

4. In a cultivator of the character described, the combination of a vehicle; a frame swingingly mounted on the vehicle; a cultivating implement mounted on said frame; a share swiveled on the outer end of said frame and supporting the same, said frame constructed with portions projecting beyond said swiveled share; and manually operated means for adjusting said share, substantially as described.

In witness whereof I have hereunto set my hand in the presence of two witnesses.

REUBEN MANSELL.

Witnesses,
GEORGE G. TURRI,
WILLIAM L. BEATTIE.